United States Patent
Yan et al.

(10) Patent No.: US 9,088,412 B2
(45) Date of Patent: Jul. 21, 2015

(54) DATA RETRANSMISSION METHOD AND USER EQUIPMENT

(75) Inventors: Kun Yan, Beijing (CN); Xiaoxiao Zheng, Shanghai (CN); Yongqiang Gao, Beijing (CN); Xueli Ma, Shanghai (CN); Jing Li, Shanghai (CN); Shuju Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 830 days.

(21) Appl. No.: 13/285,898

(22) Filed: Oct. 31, 2011

(65) Prior Publication Data

US 2012/0044798 A1  Feb. 23, 2012

Related U.S. Application Data (63) Continuation of application No. PCT/CN2009/071604, filed on Apr. 30, 2009.

(51) Int. Cl.
*H04J 1/16* (2006.01)
*H04L 1/18* (2006.01)
*H04L 12/28* (2006.01)

(52) U.S. Cl.
CPC ............ *H04L 1/1822* (2013.01); *H04L 1/1812* (2013.01); *H04L 1/1887* (2013.01)

(58) Field of Classification Search
USPC ......................................... 370/252, 278, 329
See application file for complete search history.

(56) References Cited

U.S. PATENT DOCUMENTS

| 2003/0016698 | A1 |   | 1/2003 | Chang et al. |         |
|--------------|----|---|--------|--------------|---------|
| 2009/0028259 | A1 |   | 1/2009 | Yu et al.    |         |
| 2010/0172313 | A1 | * | 7/2010 | Ho et al.    | 370/329 |

FOREIGN PATENT DOCUMENTS

| CN | 1996820 A    | 7/2007  |
| CN | 101138185 A  | 3/2008  |
| CN | 101330360 A  | 12/2008 |
| CN | 101345608 A  | 1/2009  |
| CN | 101365229 A  | 2/2009  |
| CN | 101414900 A  | 4/2009  |
| EP | 1755355 A1   | 2/2007  |
| EP | 2 048 807 A2 | 4/2009  |
| RU | 2242092 C2   | 12/2004 |

(Continued)

OTHER PUBLICATIONS

First Chinese Office Action of Chinese Application No. 200980123656.X mailed Jul. 25, 2012, 14 pages.

(Continued)

*Primary Examiner* — John Pezzlo
(74) *Attorney, Agent, or Firm* — Slater & Matsil, L.L.P.

(57) ABSTRACT

Embodiments of the present invention provide a data retransmission method and user equipment, where the method includes: if a network indicates switching from a dual stream transmission mode to a single stream transmission mode, stopping data transmission of one data stream and clearing data in an HARQ process of the stopped data stream; or if a network indicates switching from a single stream transmission mode to a dual stream transmission mode, transmitting retransmission data in an HARQ process of the original data stream without changing the HARQ process number, and transmitting new data in the HARQ process of a new data stream; or using the retransmission data of the original data stream as new data to transmit in the HARQ process of either the original data stream or new data stream.

17 Claims, 5 Drawing Sheets

(56) References Cited

FOREIGN PATENT DOCUMENTS

| RU | 2304850 C2 | 8/2007 |
|---|---|---|
| WO | WO 2006/100597 A1 | 9/2006 |
| WO | WO 2007/109634 A1 | 9/2007 |
| WO | WO 2008/024340 A2 | 2/2008 |
| WO | WO 2008/050453 A1 | 5/2008 |
| WO | 2008118067 A2 | 10/2008 |
| WO | 2009033280 A1 | 3/2009 |

OTHER PUBLICATIONS

International Search Report, International Application No. PCT/CN2009/071604, Applicant: Huawei Technologies, Co., Ltd., dated: Feb. 4, 2010, 4 pages.

Written Opinion of the International Searching Authority, International Application No. PCT/CN2009/071604, Applicant: Huawei Technologies, Co., Ltd., dated: Feb. 4, 2010, 4 pages.

Russian Office Action received in Application No. 2011148515/08, mailed Mar. 5, 2013, 7 pages.

Supplemental European Search Report received in European Patent Application No. 09843882.3, mailed Feb. 22, 2012, 10 pages.

Philips, "HARQ process handling for Rel-7 FDD MIMO," 3GPP TSG RAN WG2 Meeting #56bis, Tdoc R2-070289, Sorrento, Italy, Jan. 15-19, 2007, 3 pages.

Notice of Reasons for Rejection received in Japanese Application No. 2012-507572 mailed May 7, 2013, 6 pages.

Russian Notice of Allowance received in Application No. 2011148515/08 mailed May 13, 2013, 16 pages.

Chinese Determination of Allowance received in Application No. 2012-507572, Applicant: Huawei Technologies, Co., Ltd., mailed Feb. 12, 2014, 4 pages.

\* cited by examiner

DATA RETRANSMISSION METHOD AND USER EQUIPMENT

This application is a continuation of International Application No. PCT/CN2009/071604, filed on Apr. 30, 2009, which is hereby incorporated by reference in its entirety.

TECHNICAL FIELD

The present invention relates to communication technologies, and in particular, to a data retransmission method and user equipment.

BACKGROUND

High speed uplink packet access HSUPA (High Speed Uplink Packet Access) is an optimization and evolvement of packet services from a mobile terminal to a wireless access network in an uplink direction. Using self-adaptation encoding, physical-layer hybrid retransmission, Node B-based (NodeB, that is, base station) fast scheduling, and 2-ms TTI (Transmission Time Interval, transmission time interval)-based short-frame transmission, the HSUPA improves the highest data transmission rate and cell throughput, and reduces delay.

HSUPA data transmission is categorized into two cases: 2-ms TTI and 10-ms TTI. In case of the 2-ms TTI, a UE (User Equipment, user equipment) has eight HARQ (Hybrid Automatic Repeat Request, hybrid automatic repeat request) processes; and in case of the 10-ms TTI, a UE has four HARQ processes.

When the UE needs to transmit uplink data, the UE determines the size of a data transport block within the TTI in the corresponding HARQ process according to the grant value from a network, and transmits a data block to the network. The UE meanwhile saves the transmitted data block in the buffer of the HARQ process and waits for ACK/NACK (Acknowlegdement/Non-Acknowlegdement, acknowledgement/non-acknowledgement) information from the network. If the UE receives the ACK information from the network on an E-HICH channel (E-DCH (Enhanced Dedicated Transport Channel, enhanced dedicated transport channel) HARQ Acknowledgement Indicator Channel, E-DCH HARQ acknowledgement indicator channel), it means that the network has successfully demodulates the data. At this time, the UE clears the data block in the corresponding HARQ process. If the UE receives the NACK information or receives no information in a specified time from the network on the E-HICH, it means that the network fails to demodulate the data. At this time, the UE needs to retransmit the data block in this HARQ process until retransmission attempts reach the maximum retransmission times.

Figure 1:
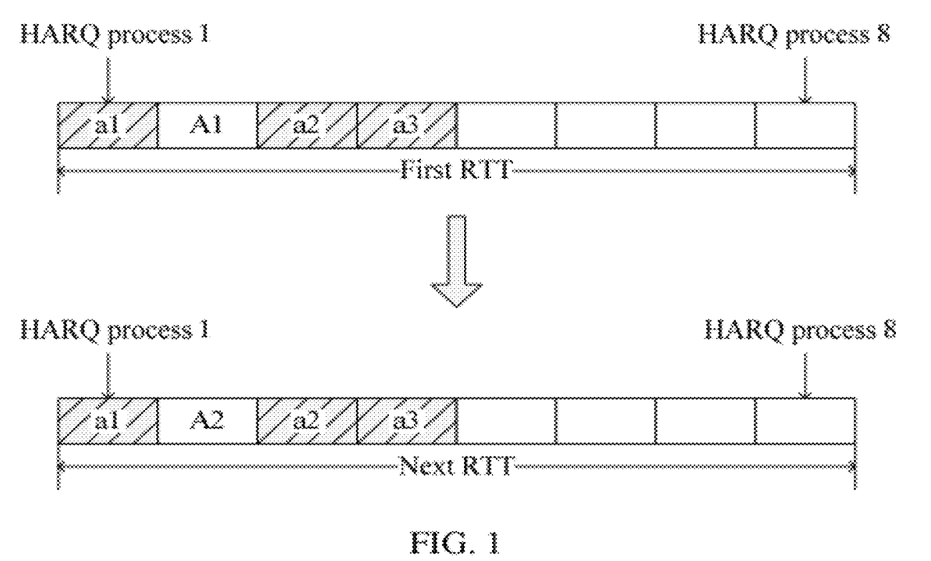
FIG. 1 is a schematic diagram of a data transmission process in a 2-ms TTI HARQ process.

As shown in FIG. 1, taking the 2-ms TTI as an example, within each TTI only one HARQ process transmits data, and the UE transmits uplink data, and transmits data al in HARQ process 1 within a first RTT (Route-Trip Time, round-trip-time), and saves data a1 in a buffer. After receiving the NACK message network on the E-HICH, the UE retransmits data a1 in HARQ process 1 within a next RTT, that is, the data a1 is retransmitted after a time period equal to an RTT. Data A1 in HARQ process 2 represents the successfully transmitted data. Therefore, new data A2 is transmitted in HARQ process 2 within a next RTT.

The inventor, during implementation of the present invention, finds that when the HSUPA uses the MIMO (multiple input multiple output, multiple input multiple output) technology in the uplink direction, the UE may transmit two data blocks concurrently within a TTI, that is, dual stream data transmission. In this case, the network may send signaling to notify the UE to switch from a dual stream transmission mode to a single stream transmission mode. Or the UE transmits only one data block within a TTI, that is, single stream data transmission. In this case, the network may send signaling to notify the UE to switch from a single stream transmission mode to a dual stream transmission mode.

Therefore, when the UE works in the MIMO mode and transmits uplink data in the dual stream transmission mode, the UE is incapable of processing the data buffered in the HARQ process of a stopped data stream if receiving from the network a command instructing switching from the dual stream transmission mode to the singe-flow transmission mode. Similarly, when the UE works in the MIMO mode and transmits uplink data in the single stream transmission mode, the UE is capable of processing the data buffered in the HARQ process of an original data stream if receiving a command instructing switching from the single stream transmission mode to the dual stream transmission mode.

SUMMARY OF THE INVENTION

To solve the forgoing problems pointed out in the prior art, embodiments of the present invention provide a data retransmission method and user equipment.

An embodiment of the present invention provides a data retransmission method, where the retransmission method includes: if a network indicates switching from a dual stream transmission mode to a single stream transmission mode, stopping data transmission of one data stream and clearing data in an HARQ process of the stopped data stream; or if a network indicates switching from a single stream transmission mode to a dual stream transmission mode, transmitting retransmission data in an HARQ process of the original data stream without changing the HARQ process number, and transmitting new data in the HARQ process of a new data stream; or using the retransmission data of the original data stream as new data to transmit in the HARQ process of either the original data stream or new data stream.

An embodiment of the present invention provides a user equipment, where the user equipment includes: a receiving unit, configured to receive a single/dual stream transmission mode switching command delivered by a network; a processing unit, configured to stop data transmission of one data stream in a dual stream transmission mode if the single/dual stream transmission mode switching command instructing switching from the dual stream transmission mode to the single stream transmission mode; and a data clearing unit, configured to clear data in an HARQ process of the stopped data stream.

An embodiment of the present invention further provides a user equipment, where the user equipment includes: a receiving unit, configured to receive a single/dual stream transmission mode switching command delivered by a network; and a processing unit, configured to transmit data in a single stream transmission mode in two paths of data streams when the receiving unit receives the single/dual stream transmission mode switching command instructing switching from the single stream transmission mode to the dual stream transmission mode.

According to the data retransmission method and user equipment in the embodiments of the present invention, the problem of data transmission in the corresponding HARQ process of the stopped data stream when the dual stream transmission mode is switched to the single stream transmission mode after the MIMO technology is used can be solved; data loss can be effectively reduced; and quick data retransmission can be achieved.

BRIEF DESCRIPTION OF THE DRAWINGS

The accompanying drawings described here are used for facilitating further understanding of the present invention, form a part of this application, but are not intended to limit the present invention. In these drawings.

DETAILED DESCRIPTION OF ILLUSTRATIVE EMBODIMENTS

To make the objectives, technical solutions, and advantages of the embodiments of the present invention clearer, the following section describes the embodiments of the present invention in further details with reference to the accompanying drawings. Here, the exemplary embodiments of the present invention and illustrations are used for explaining the present invention, but are not intended to limit the present invention.

Embodiment 1

An embodiment of the present invention provides a data retransmission method. The following section describes this embodiment in details with reference to the accompanying drawing.

Figure 2:
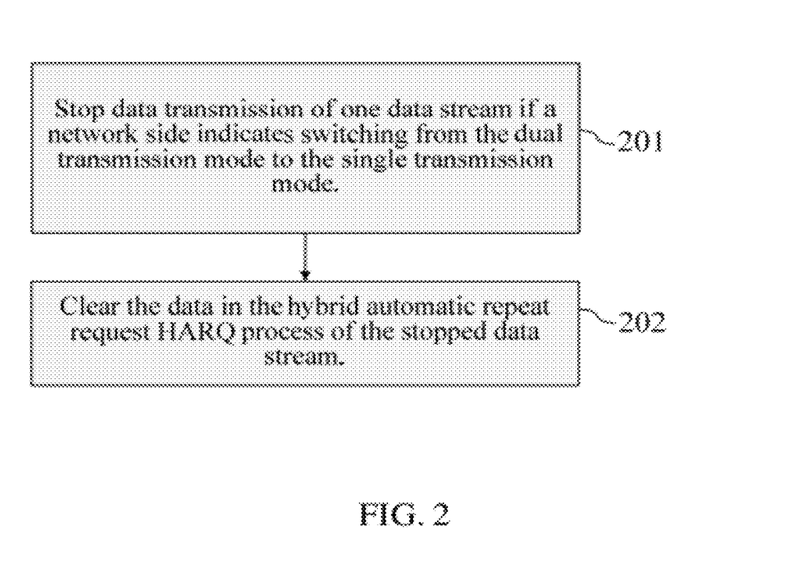
FIG. 2 is a flow chart of a method according to an embodiment of the present invention.

FIG. 2 is a flow chart of a method according to an embodiment of the present invention. The data retransmission method according to this embodiment is applicable to a UE. The method is specifically applied to a data transmission process after the UE in MIMO (Multiple Input Multiple Output, multiple input multiple output) mode receives a command for switching the data stream transmission mode. Referring to FIG. 2, the method in this embodiment mainly includes the following.

201: Stop data transmission of one data stream.

202: Clear data in an HARQ process of the stopped data stream.

According to this embodiment, when receiving, a command for switching from a dual stream transmission mode to a single stream transmission mode from a network, for example a Node B (It is assumed that data transmission of data stream 2 is stopped), the UE switches from the dual stream transmission mode to the single stream transmission mode, and stops data transmission of one data stream. The UE may clear the data in all HARQ processes of the stopped data stream, or clear the data in all HARQ processes of the stopped data stream after the data is transmitted in the HARQ process of another data stream.

The data in the HARQ process of the stopped data stream may be transmitted in the HARQ process of another data stream in multiple different modes. The following section describes these modes in details with reference to the accompanying drawings and different embodiments.

According to the method in this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 2

An embodiment of the present invention further provides a data retransmission method. The following section describes this embodiment in details with reference to the accompanying drawing.

Still referring to FIG. 2, according to the method in this embodiment, when the UE works in the MIMO mode and before the UE switches from the dual stream transmission mode to the single stream transmission mode according to a single/dual stream transmission mode switching command delivered by the network, that is, before stopping data transmission of one data stream, the UE waits until the data to be retransmitted in the HARQ process of the data stream is retransmitted successfully. That is to say, the UE does not stop data transmission in dual stream transmission mode temporarily, and switches the transmission mode after the data to be retransmitted in all HARQ processes of the data stream to be stopped is retransmitted successfully, that is, the UE stops the data transmission of the this data stream.

In this embodiment, when receiving a command for switching from the dual stream transmission mode to the single stream transmission mode from the Node B, assuming that data transmission of data stream 2 is stopped, the UE does not immediately switch from the dual stream transmission mode to the single stream transmission mode, but stops new data transmission of data stream 2. All the new data is transmitted in the HARQ process of data stream 1, and data stream 2 continuously transmits the data to be retransmitted. When all the data to be retransmitted in data stream 2 is retransmitted successfully or retransmission attempts of the last one or several pieces of data have reached the maximum retransmission times, the UE switches from the dual stream transmission mode to the single stream transmission mode.

According to the method in this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 3

An embodiment of the present invention further provides a data retransmission method. The following section describes this embodiment in details with reference to the accompanying drawing.

Still referring to FIG. 2, according to the method in this embodiment, when the UE works in the MIMO mode and switches from the dual stream transmission mode to the single stream transmission mode according to a single/dual stream transmission mode switching command delivered by the network, the UE retransmits the data in all the HARQ processes of the stopped data stream as new data.

In this embodiment, when receiving a command for switching the dual stream transmission mode to the single stream transmission mode from the Node B, assuming that data transmission of data stream 2 is stopped, the UE switches from the dual stream transmission mode to the single stream transmission mode, and meanwhile transmits the data stored in the HARQ process of data stream 2 as the new data in the HARQ process of data stream 1.

According to this embodiment, during data transmission of data stream 2, the UE may ignore the AG/RG (Absolute Grant/Relative Grant, absolute grant/relative grant) message transmitted by the network.

In this embodiment, data transmission of data stream 2 needs to be performed in a new HARQ process of data stream 1, which does not affect data retransmission in the HARQ process of data stream 1. After data in all HARQ processes corresponding to data stream 2 is transmitted, the data buffered in the HARQ process corresponding to data stream 2 is cleared.

Figure 3:
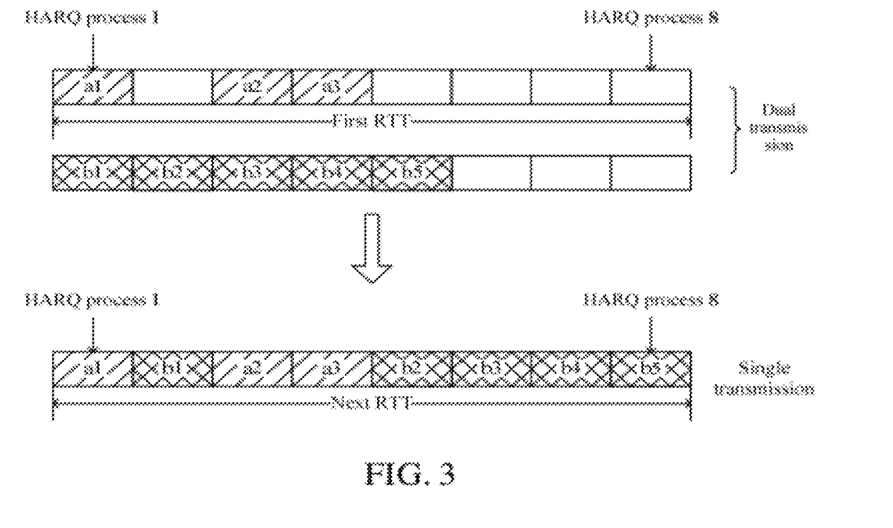
FIG. 3 is a schematic diagram of retransmission when switching from a dual stream transmission mode to a single stream transmission mode according to an embodiment of the present invention.

The following describes this embodiment in details with reference to the retransmission process when switching from the dual stream transmission mode to the single stream transmission mode shown in FIG. 3

Referring to FIG. 3, this embodiment takes the 2-ms TTI as an example, when the UE switches from the dual stream transmission mode to the single stream transmission mode, data in all the HARQ processes of data stream 2 all needs to be retransmitted as new data in data stream 1. There are three retransmission data, a1, a2, and a3, in the HARQ process of the data stream 1. Therefore, when data is transmitted in data stream 1, the retransmission data in the data stream 1 is retransmitted in the corresponding data stream process. Data to be retransmitted in data stream 2 data, b1, b2, b3, b4, and b5, need to be transmitted in the HARQ process, where no data is retransmitted, of data stream 1.

This embodiment takes the 2-ms TTI as an example. When the 10-ms TTI is used, the method for switching from the dual stream transmission mode to the single stream transmission mode is the same as that described in the forgoing embodiment, which is not detailed here. However, in case of the 10-ms TTI, there are four the HARQ processes.

According to this embodiment, the case that data transmission of data stream 2 is stopped is taken as an example. However, this embodiment is not limited thereto. The UE may also stop data transmission of data stream 1. The operating process is the same as that described in this embodiment, which is not detailed here.

According to the method in this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 4

An embodiment of the present invention further provides a data retransmission method. The following section describes this embodiment in details with reference to the accompanying drawing.

Still referring to FIG. 2, according to the method in this embodiment, when the UE works in the MIMO mode and switches from the dual stream transmission mode to the single stream transmission mode according to a single/dual stream transmission mode switching command delivered by the network, the UE retransmits the data in the HARQ processes, the feedback of which is NACK, in the stopped data stream as new data.

In this embodiment, when receiving a command for switching from the dual stream transmission mode to the single stream transmission mode from the Node B, assuming that data transmission of data stream 2 is stopped, the UE switches from the dual stream transmission mode to the single stream transmission mode, and meanwhile waits for the feedback of all the HARQ processing of data stream 2. When the feedback of a corresponding HARQ process is NACK, the UE retransmits the data of the corresponding HARQ process in the HARQ process for transmitting new data of data stream 1.

According to this embodiment, during data transmission of data stream 2, the UE may ignore the AG/RG message transmitted by the network.

In this embodiment, data transmission of data stream 2 needs to be performed in a new HARQ process of data stream 1, which does not affect data retransmission in the HARQ process of data stream 1. After data in the HARQ process, for which a NACK message is received, of data stream 2 is transmitted, the data buffered in the HARQ process of data stream 2 is cleared.

Figure 4:
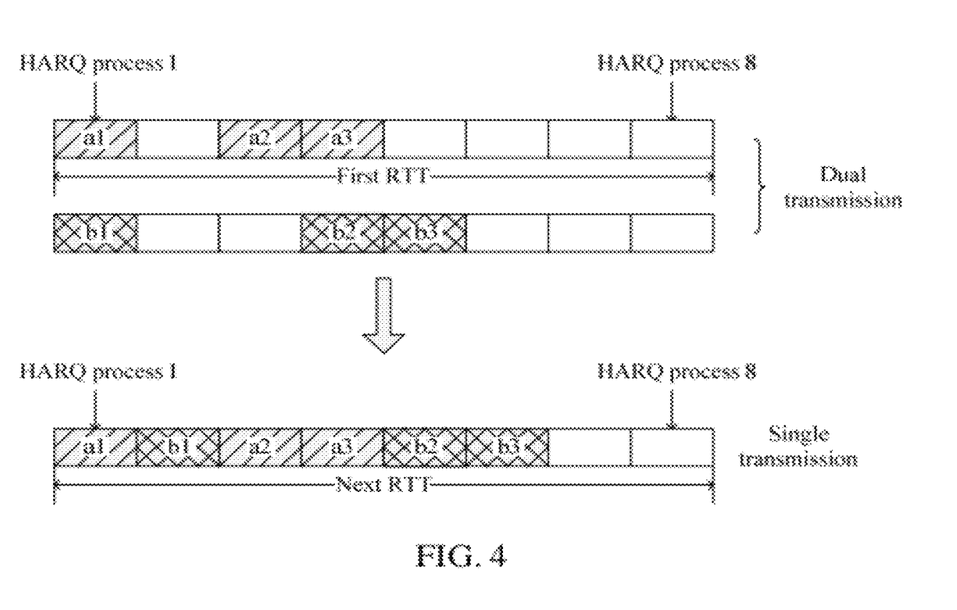
FIG. 4 is a schematic diagram of retransmission when switching from a dual stream transmission mode to a single stream transmission mode according to another embodiment of the present invention.

The following section describes this embodiment in details with reference to the retransmission process when switching from the dual stream transmission mode to the single stream transmission mode shown in FIG. 4.

Referring to FIG. 4, according to this embodiment, the 2-ms TTI is taken as an example, after the UE switches from the dual stream transmission mode to the single stream transmission mode, data b1, b2, and b3, in the HARQ process, for which a NACK message is received, of data stream 2 needs to be retransmitted in data stream 1. There are three retransmission data, that is, a1, a2, and a3, in the HARQ process of the data stream 1. Therefore, when data is transmitted in data stream 1, the retransmission data in the data stream 1 is retransmitted in the corresponding process. Data to be retransmitted of data stream 2 needs to be transmitted in the HARQ process, where no data needs to be retransmitted, of data stream 1.

According to this embodiment, the 2-ms TTI is taken as an example. When the 10-ms TTI is used, the method for switching from the dual stream transmission mode to the single stream transmission mode is the same as that described in the forgoing embodiment, which is not detailed here. However, in case of the 10-ms TTI, there are four the HARQ processes.

According to this embodiment, the case that data transmission of data stream 2 is stopped is taken as an example. However, this embodiment is not limited thereto. The UE may also stop data transmission of data stream 1. The operating process is the same as that described in this embodiment, which is not detailed here.

According to the method in the present invention, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 5

An embodiment of the present invention further provides a data retransmission method. The following describes this embodiment in details with reference to the accompanying drawing.

Still referring to FIG. 2, according to the method in this embodiment, when the UE works in the MIMO mode and switches the dual stream transmission mode to the single stream transmission mode according to a single/dual stream transmission mode switching command delivered by the network, the UE judges whether data in the HARQ processes of two flows corresponding to each TTI needs to be retransmitted, and transmits the data in the HARQ process of the stopped data stream.

In this embodiment, when receiving a command for switching from the dual stream transmission mode to the single stream transmission mode from the Node B, assuming that data transmission of data stream 2 is stopped, the UE switches from the dual stream transmission mode to the single stream transmission mode, and judges whether the data in each HARQ process of data stream 1 needs to be retransmitted. If the data needs to be retransmitted, the UE retransmits the data in the corresponding HARQ process. If the data in the HARQ process of the data stream 1 does not need to be retransmitted, the UE judges whether the data in the HARQ process of data stream 2 within the same TTI as data stream 1 need to be retransmitted. If the data needs to be retransmitted, the UE retransmits the data of data stream 2 in the HARQ process of data stream 1; if the data in the HARQ process of data stream 2 does not need to be retransmitted, the UE transmits new data in the HARQ process of data stream 1.

According to this embodiment, during data transmission of data stream 2, the UE may ignore the AG/RG message transmitted by the network.

Figure 5A:
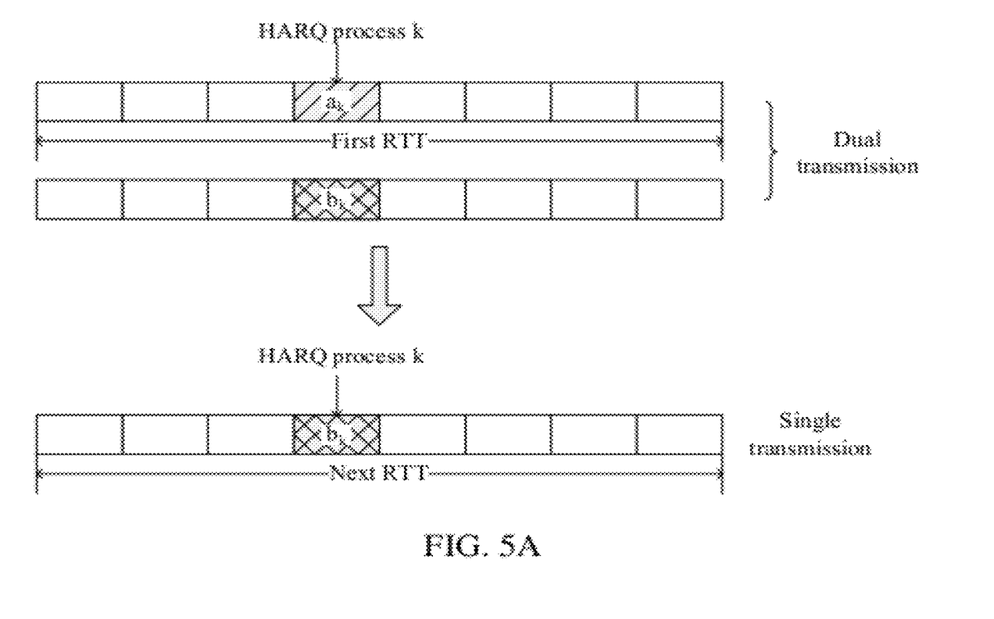
FIG. 5A and FIG. 5B are a schematic diagrams of retransmission when switching from a dual stream transmission mode is switched to a single stream transmission mode according to another embodiment of the present invention.
Figure 5B:
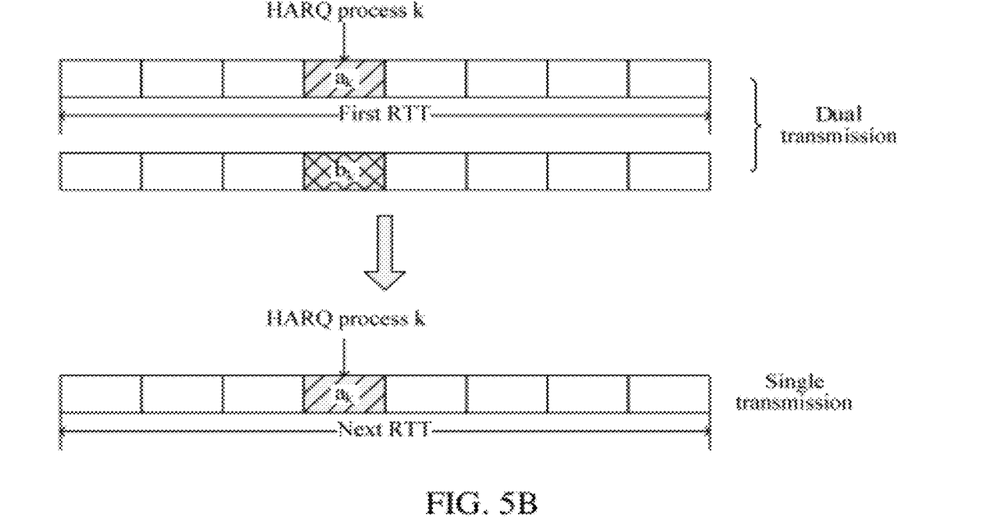

The following section describes this embodiment in details with reference to the retransmission process when switching from the dual stream transmission mode to the single stream transmission mode shown in FIG. 5A and FIG. 5B.

Referring to FIG. 5A and FIG. 5B, according to this embodiment, the 2-ms TTI is taken as an example. After the UE switches from the dual stream transmission mode to the single stream transmission mode, if data $a_k$ in the HARQ process of data stream 1 does not need to be retransmitted, but data $b_k$ in the HARQ process of data stream 2 within the same TTI as data stream 1 needs to be retransmitted, after switching to the single stream transmission mode, data $b_k$ is transmitted in the corresponding HARQ process k of data stream 1. As shown in FIG. 5A, if data $a_k$ in the HARQ process of data stream 1 needs to be retransmitted, after switching to the single stream transmission mode, data $a_k$ is transmitted in the corresponding HARQ process k of data stream 1. At this time, whether data $b_k$ in the HARQ process of data stream 2 within the same TTI as data stream 1 needs to be retransmitted is not considered. If the data $b_k$ in the HARQ process of data stream 2 within the same TTI as data stream 1 also needs to be retransmitted, the data is discarded, as shown in FIG. 5B.

According to this embodiment, the 2-ms TTI is taken as an example. When 10-ms TTI is used, the method for switching from the dual stream transmission mode to the single stream transmission mode is the same as that described in the forgoing embodiment, which is not detailed here. However, in case of the 10-ms TTI, there are four HARQ processes.

According to this embodiment, the case that data transmission of data stream 2 is stopped is taken as an example. However, this embodiment is not limited thereto. The UE may also stop data transmission of data stream 1. The operating process is the same as that described in this embodiment, which is not detailed here.

According to the method according to this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 6

An embodiment of the present invention further provides a data retransmission method. The following section describes this embodiment in details with reference to the accompanying drawing.

Still referring to FIG. 2, according to the method in this embodiment, when the UE works in the MIMO mode and switches from the single stream transmission mode to the dual stream transmission mode according to a single/dual stream transmission mode switching command delivered by the network, the UE respectively transmits the data in the HARQ process of the original data stream.

In this embodiment, when receiving a command for switching from the single stream transmission mode to the dual stream transmission mode from the Node B, assuming that data stream 2 is added for data transmission, the UE switches from the single stream transmission mode to the dual stream transmission mode, and transmits the to-be-retransmitted data of data stream 1 in the HARQ process of original data stream 1 without changing the HARQ process number. Or the UE transmits the data to be retransmitted in the HARQ process of original data stream 1 as new data in any of the two data streams.

According to this embodiment, the data to be retransmitted of data stream 1 may be transmitted in the HARQ process of new data stream 2.

According to the method according to this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

Embodiment 7

An embodiment of the present invention further provides a user equipment. The following section describes this embodiment in details with reference to the accompanying drawing.

Figure 6:
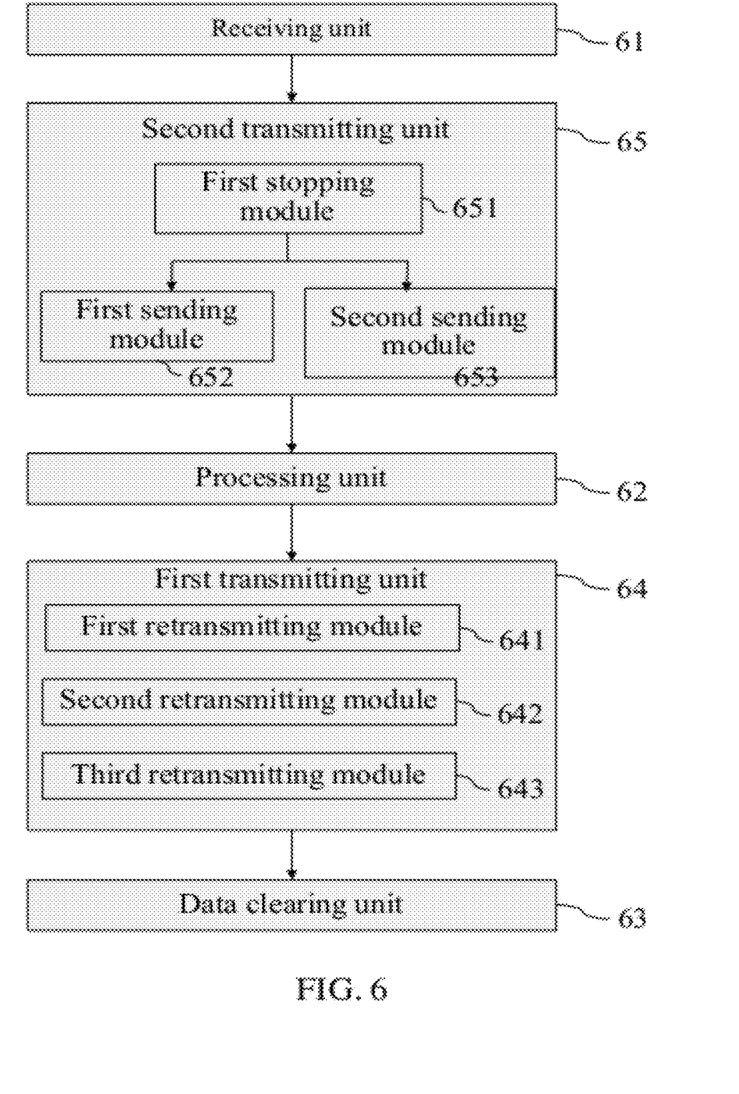
FIG. 6 is a structural block diagram of a user equipment according to an embodiment of the present invention.

FIG. 6 is a structural block diagram of a user equipment in this embodiment. The user equipment according to this embodiment may use the data retransmission methods from Embodiment 1 to Embodiment 5. Referring to FIG. 6, the user equipment in this embodiment includes: a receiving unit 61, a processing unit 62, and a data clearing unit 63.

The receiving unit 61 is configured to receive a single/dual stream transmission mode switching command delivered by a network.

The processing unit 62 is configured to switch the transmission mode according to the single/dual stream transmission mode switching command delivered by the network. For example, when the receiving unit 61 receives from the network a command instructing switching from the dual stream transmission mode to the single stream transmission mode, the processing unit 62 switches from the dual stream transmission mode to the single stream transmission mode, and stops data transmission of one data stream in dual stream transmission mode.

The clearing unit 63 is configured to clear the data in the HARQ process of the stopped data stream.

According to another embodiment of the present invention, the user equipment may further includes:

a first transmitting unit 64, configured to transmit the data in the HARQ process of the stopped data stream in the HARQ process of another data stream after the processing unit stops data transmission of one data stream in dual stream transmission mode.

In this embodiment, the first transmitting unit 64 includes any one or combination of the following modules:

a first retransmitting module 641, configured to, if data in another data stream needs to be retransmitted, transmit the data to be retransmitted in the corresponding HARQ process of the another data stream, and transmit the data in the HARQ process of the stopped data stream in the HARQ process, where no data needs to be retransmitted, of the another data stream;

a second retransmitting module 642, configured to, if feedback of the HARQ process of the stopped data stream is NACK, transmit the data in the HARQ process, the feedback of which is NACK, of the stopped data stream, in the HARQ process, where no data is retransmitted, of the another data stream; and a third retransmitting module 643, configured to: if data in the HARQ process of another data stream needs to be retransmitted, transmit the data in the corresponding HARQ process of the another data stream; if the data in the HARQ process of the another data stream does not need to be retransmitted and the data in the HARQ process of the stopped data stream needs to be retransmitted, transmit the data in the HARQ process of the stopped data stream in the corresponding HARQ process of another data stream; and if the data in the HARQ process of the another data stream does not need to be retransmitted and the data in the HARQ process of the stopped data stream does not need to be retransmitted, transmit new data in the another data stream.

According to an embodiment of the present invention, the user equipment may further includes:

a second transmitting unit 65, configured to, after the receiving unit 61 receives the command instructing switching from a dual stream transmission mode to a single stream transmission mode from network, respectively transmit new data and data to be retransmitted in dual stream transmission mode before the processing unit 62 stops data transmission of one data stream in dual stream transmission mode.

According to this embodiment, the second transmission unit 65 includes:

a first stopping module 651, configured to stop new data transmission of one data stream in dual stream transmission mode;

a first transmitting module 652, configured to transmit the new data of the one data stream in the HARQ process of another data stream; and a second transmitting module 653, configured to transmit data to be retransmitted in the HARQ process of the one data stream until the data is retransmitted or retransmission attempts reach the maximum retransmission times.

The user equipment in this embodiment may use the methods from Embodiment 1 to Embodiment 5. In the method embodiments, the steps of the method have been described in details, which are not detailed here.

According to the user equipment in this embodiment, the problem of data transmission in the HARQ process of the stopped data stream when the dual stream transmission mode is switched to the single stream transmission mode or the problem of data transmission in the HARQ process of the original data stream when single stream transmission mode is switched to the dual stream transmission mode, after the MIMO technology is used in the uplink can be solved; data loss can be effectively reduced; and quick data retransmission can be achieved.

Embodiment 8

An embodiment of the present invention further provides a user equipment. The following section describes this embodiment in details with reference to the accompanying drawing.

Figure 7:
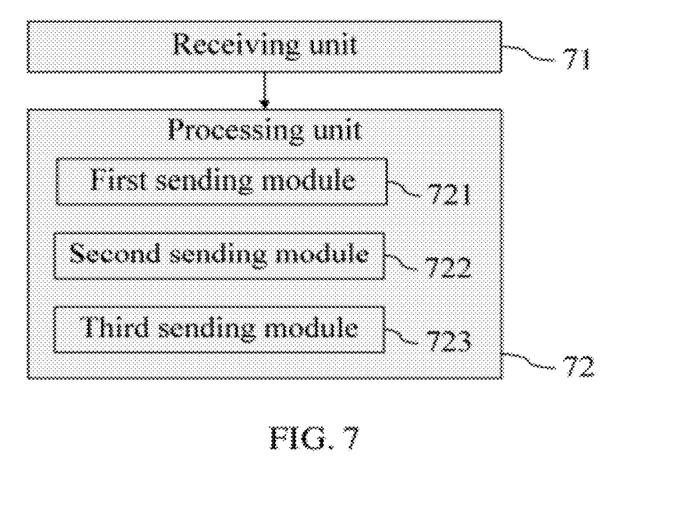
FIG. 7 is a structural block diagram of a user equipment according to another embodiment of the present invention.

FIG. 7 is a structural block diagram of a user equipment according to this embodiment. The user equipment in this embodiment may use the data retransmission methods disclosed in Embodiment 6. Referring to FIG. 7, the user equipment in this embodiment mainly includes: a receiving unit 71 and a processing unit 72.

The receiving unit 71 is configured to receive a single/dual stream transmission mode switching command delivered by a network.

The processing unit 72 is configured to switch from the single stream transmission mode to the dual stream transmission mode and transmit data in the single stream transmission mode in two paths of data streams when the receiving unit 71 receives the command transmitted by the network instructing switching from the single stream transmission mode to the dual stream transmission mode.

According to one embodiment of the present invention, the processing unit 72 may include:

a first transmitting module 721, configured to transmit data to be retransmitted in the HARQ process of the original data stream, without changing the HARQ process number; and a second transmitting module 722, configured to transmit new data in a corresponding HARQ process of a new data stream.

According to another embodiment of the present invention, the processing unit 72 may include:

a third transmitting module 723, configured to transmit the to-be-retransmitted data of the original data stream as the new data in the HARQ process of either the original data stream or new added data stream.

The user equipment in this embodiment may use the methods disclosed in Embodiment 6. In the method embodiments, the steps of the method have been described in details, which are not detailed here.

According to the user equipment in this embodiment, the problem of data transmission in the HARQ process of the stopped data stream when the dual stream transmission mode is switched to the single stream transmission mode after the MIMO technology is used in the uplink can be solved; data loss can be effectively reduced; and quick data retransmission can be achieved.

The steps of methods or algorithms disclosed in the embodiments of the present invention may be performed by the hardware or software module enabled by the processor, or performed by a combination of the hardware and software modules. The software module may be stored in a random access memory (RAM), a memory, a read-only memory (ROM), an electrically programmable ROM, electrically erasable programmable ROM, a register, a hard disk, a portable magnetic disk, a CD-ROM, or any storage medium in other forms well-known in the technology field.

The above embodiments are used for describing the objectives, the technical solutions and beneficial effects of the present invention in details. Persons skilled in the art should understand that, the forging embodiments are merely the embodiments of the present invention, but not intended to limit the protection scope of the present invention. Any modification, equivalent replacement, or improvement made without departing from the spirit and principle of the present invention should fall within the protection scope of the present invention.

What is claimed is:

1. A data retransmission method, comprising:
   if a network indicates switching from a dual stream transmission mode to a single stream transmission mode, stopping data transmission of a first data stream, and clearing data in a hybrid automatic repeat request (HARQ) process of the stopped data stream; and
   if a network indicates switching from a single stream transmission mode to a dual stream transmission mode, transmitting retransmission data in a HARQ process of the first data stream without changing the HARQ process number, and transmitting new data in the HARQ process of a second data stream; or using the retransmission data of the first data stream as new data to transmit in the HARQ process of either the first data stream or the second data stream.

2. The method according to claim 1, wherein before clearing the data in the HARQ process of the stopped data stream, the method further comprises:
   transmitting the data in the HARQ process of the stopped data stream in the HARQ process of the second data stream.

3. The method according to claim 2, wherein transmitting the data in the HARQ process of the stopped data stream in the HARQ process of the second data stream comprises:
   if data in the second data stream needs to be retransmitted, transmitting the data to be retransmitted in the corresponding HARQ process of the second data stream, and transmitting the data in the HARQ process of the stopped data stream in the HARQ process, where no data is retransmitted, of the second data stream.

4. The method according to claim 2, wherein transmitting the data in the HARQ process of the stopped data stream in the HARQ process of the second data stream comprises:
   waiting for feedback of all the HARQ processes of stopped data streams; and
   if feedback of a HARQ process of the stopped data stream is a NACK message, transmitting the data in the HARQ process, the feedback of which is a NACK message, of the stopped data stream in the HARQ process, where no data is retransmitted, of the second data stream.

5. The method according to claim 2, wherein transmitting the data in the HARQ process of the stopped data stream in the HARQ process of the second data stream comprises:
   judging whether data in the HARQ process of the second data stream needs to be retransmitted;
   transmitting the data in the corresponding HARQ process of the second data stream if data in the HARQ process of the second data stream needs to be retransmitted;
   judging whether the data in the HARQ process, the same as the HARQ process of the second data stream, of the stopped data stream needs to be retransmitted if the data in the HARQ process of the second data stream does not need to be retransmitted; and
   transmitting the data in the HARQ process, the same as the HARQ process of the second data stream, of the stopped data stream in the HARQ process of the second data stream if the data in the HARQ process of the stopped data stream needs to be retransmitted; and transmitting new data in the second data stream if the data in the HARQ process of the stopped data stream does not need to be retransmitted.

6. The method according to claim 1, wherein before stopping the data transmission of the one data stream, the method further comprises:
   stopping new data transmission of the first data stream, and transmitting the new data of the first data stream in the HARQ process of the second data stream; and
   transmitting data to be retransmitted in the HARQ process of the first data stream until all data to be retransmitted of the first data stream is transmitted or data retransmission attempts reach a maximum retransmission times.

7. The method of claim 1, wherein the method comprises:
   transmitting new data in the HARQ process of a second data stream and retransmission data in a HARQ process of the first data stream without changing the HARQ process number when a transmission mode switching command indicates an instruction to switch from the single stream transmission mode to the dual stream transmission mode.

8. The method of claim 1, wherein the method comprises:
   using the retransmission data of the first data stream as new data to transmit in the HARQ process of the first data stream when a transmission mode switching command indicates an instruction to switch from the single stream transmission mode to the dual stream transmission mode.

9. The method of claim 1, wherein the method comprises:
   using the retransmission data of the first data stream as new data to transmit in the HARQ process of the second data stream when a transmission mode switching command indicates an instruction to switch from the single stream transmission mode to the dual stream transmission mode.

10. A user equipment, comprising:
    a receiving unit, configured to receive a transmission mode switching command delivered by a network, the transmission mode switching command instructing the user equipment to switch transmission modes;
    a processing unit, configured to stop data transmission of a first data stream in a dual stream transmission mode if the transmission mode switching command instructs the user equipment to switch from the dual stream transmission mode to a single stream transmission mode; and
    a clearing unit, configured to clear the data in a hybrid automatic repeat request (HARQ) process of the stopped data stream.

11. The user equipment according to claim 10, further comprising:
    a first transmitting unit, configured to transmit the data in the HARQ process of the stopped data stream in the HARQ process of a second data stream.

12. The user equipment according to claim 11, wherein the first transmitting unit comprises one or any combination of the following modules:
    a first retransmitting module, configured to, if data in the second data stream needs to be retransmitted, transmit the data in the corresponding HARQ process of the second data stream and transmit the data in the HARQ process of the stopped data stream in the HARQ process, where no data needs to be retransmitted, of the second data stream;
    a second retransmitting module, configured to, if feedback for the HARQ process of the stopped data stream is a NACK message, transmit the data in the HARQ process, the feedback of which is a NACK message, of the stopped data stream in the HARQ process, where no data is retransmitted, of the second data stream; and a third retransmitting module, configured to: if data in the second data stream needs to be retransmitted, transmit the data in the corresponding HARQ process of the second data stream; if data in the HARQ process of the second data stream does not need to be retransmitted and the data in the HARQ process of the stopped data stream needs to be retransmitted, transmit the data in the HARQ process of the stopped data stream in the HARQ process of the second data stream; and if the data in the second data stream does not need to be retransmitted and the data in the HARQ process of the stopped data stream does not need to be retransmitted, transmit new data in the second data stream.

13. The user equipment according to claim 10, further comprising:

a second transmitting unit, configured to, after receiving the transmission mode switching command instructing the user equipment to switch from the dual stream transmission mode to the single stream transmission mode from a network device, respectively transmit new data and data to be retransmitted in the dual stream transmission mode before the processing unit stops data transmission of the first data stream in the dual stream transmission mode.

14. The user equipment according to claim 13, wherein the second transmitting unit comprises:

a first stopping module, configured to stop new data transmission of the first data stream;

a first transmitting module, configured to transmit the new data of the first data stream in the HARQ process of the second data stream; and a second transmitting module, configured to transmit data to be retransmitted in the HARQ process of the first data stream until the data is retransmitted or retransmission attempts reach the maximum retransmission times.

15. A user equipment, comprising:

a receiving unit, configured to receive a transmission mode switching command delivered by a network, the transmission mode switching command instructing the user equipment to switch transmission modes; and a processing unit, configured to transmit data in a single stream transmission mode in two paths of data streams when the transmission mode switching command instructs the user equipment to switch from the single stream transmission mode to a dual stream transmission mode.

16. The user equipment according to claim 15, wherein the processing unit comprises:

a first transmitting module, configured to transmit data to be retransmitted in a hybrid automatic repeat request (HARQ) process of a first data stream, without changing the HARQ process number; and a second transmitting module, configured to transmit new data in an HARQ process of a second data stream.

17. The user equipment according to claim 15, wherein the processing unit comprises:

a third transmitting module, configured to transmit the data to be retransmitted of the first data stream as new data in the HARQ process of either the first data stream or the second data stream.

* * * * *